United States Patent [19]

Bionaz

[11] 4,353,444

[45] Oct. 12, 1982

[54] TRANSMISSION WITH HYDRAULIC COUPLING DEVICE AND LOCKING CLUTCH SUITABLE FOR A MOTOR VEHICLE

[75] Inventor: Jean E. Bionaz, Fontenay-sous-Bois, France

[73] Assignee: Societe Anonyme Francaise du Ferodo, Paris, France

[21] Appl. No.: 135,923

[22] Filed: Mar. 31, 1980

[30] Foreign Application Priority Data

Apr. 2, 1979 [FR] France .................................. 79 08192

[51] Int. Cl.³ .......................... F16H 45/02; F16D 3/12
[52] U.S. Cl. ................................... 192/3.29; 192/3.28; 192/70.18; 192/106.1
[58] Field of Search ....................... 192/3.28, 3.29, 3.3, 192/3.31, 106.1, 106.2, 89 B, 70.18; 64/23.5

[56] References Cited

U.S. PATENT DOCUMENTS

| | | | |
|---|---|---|---|
| 2,110,051 | 3/1938 | Nutt et al. ...................... | 192/106.2 X |
| 2,234,443 | 3/1941 | MacBeth ........................... | 192/106.1 |
| 2,407,757 | 9/1946 | MacCallum ....................... | 192/89 B |
| 3,130,828 | 4/1964 | Maurice .......................... | 192/89 B X |
| 3,425,529 | 2/1969 | Hayashi ........................... | 192/89 B X |
| 3,489,256 | 1/1970 | Binder et al. .................. | 192/89 B X |
| 3,527,329 | 9/1970 | Jordan ............................ | 192/89 B X |
| 3,762,516 | 10/1973 | Matsushita ..................... | 192/89 B X |
| 4,049,093 | 9/1977 | Vukovich et al. .................. | 192/3.3 |
| 4,266,641 | 5/1981 | Sunohara ..................... | 192/106.2 X |

FOREIGN PATENT DOCUMENTS

| | | | |
|---|---|---|---|
| 537359 | 6/1941 | United Kingdom .............. | 192/89 B |
| 1242318 | 8/1971 | United Kingdom .............. | 192/89 B |

Primary Examiner—Rodney H. Bonck
Attorney, Agent, or Firm—Charles E. Brown

[57] ABSTRACT

The invention relates to a motor vehicle transmission of the kind incorporating a hydraulic coupling device such as a torque converter and a lock-up clutch. The transmission comprises, between an input shaft and an output shaft, a hydraulic coupling having impeller and turbine wheels and a clutch which provides direct drive between the shafts when engaged. The clutch has a friction coupling element for frictionally engaging an input element integral in rotation with the input shaft, and a torsion damping assembly.

According to the invention, a tab connection is used between the friction coupling element an output element rotatable with the output shaft.

14 Claims, 15 Drawing Figures

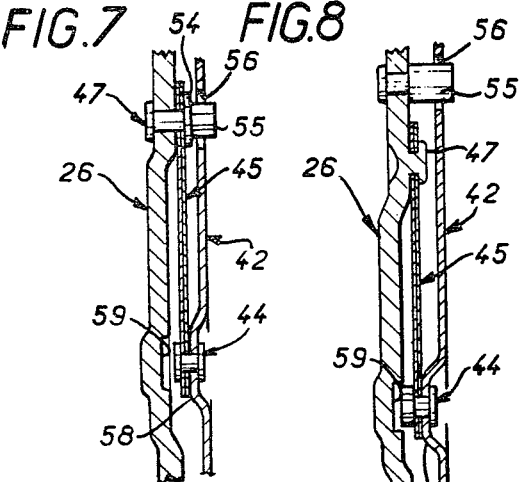
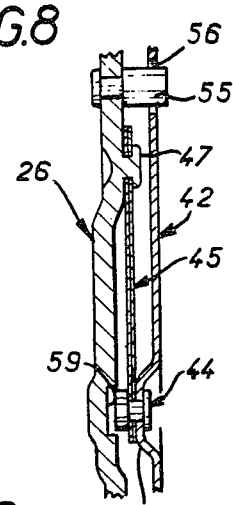
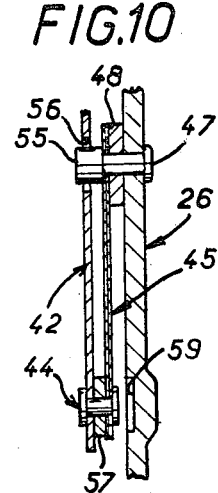
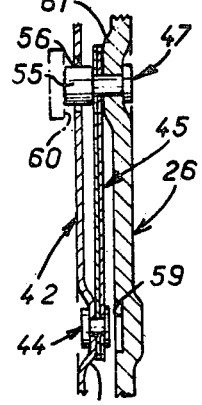
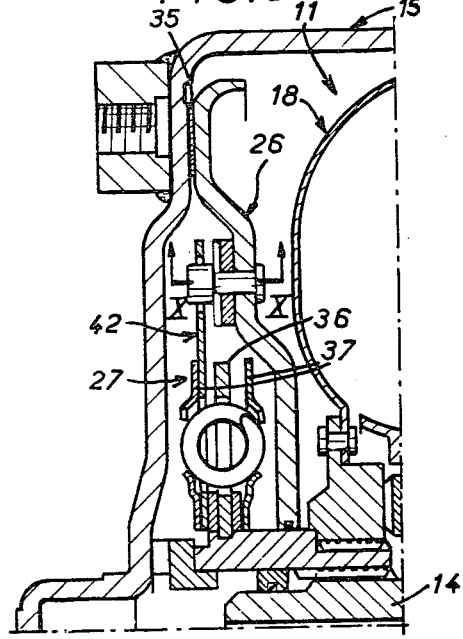
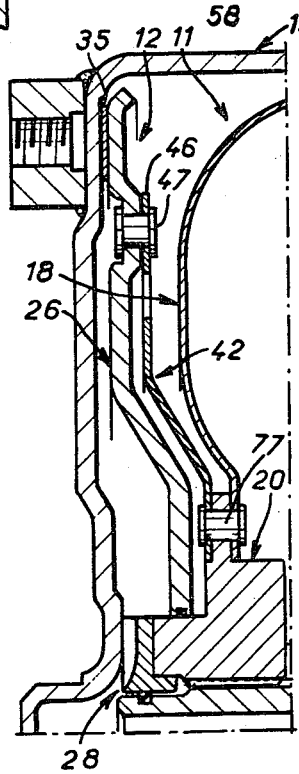
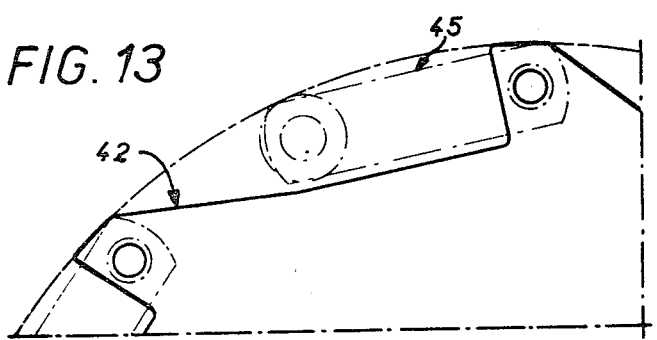

TRANSMISSION WITH HYDRAULIC COUPLING DEVICE AND LOCKING CLUTCH SUITABLE FOR A MOTOR VEHICLE

BACKGROUND OF THE INVENTION

This invention relates generally to transmissions with a hydraulic coupling member and locking clutch, i.e. transmissions of the kind comprising, in parallel between an input element intended to be rotationally integral with a first shaft, (usually the drive shaft) and an output element intended to be rotationally integral with a second shaft, (usually the driven shaft) on the one hand a hydraulic coupling member, such as a torque converter or hydraulic coupler, which comprises an impeller wheel rotationally integral with the input element and a turbine wheel rotationally integral with the output element, and on the other hand a clutch which, on starting up and usually each time the gear ratio is changed, is idle in a first stage and thus first allows the hydraulic coupling member to intervene between the input element and the output element and which, in a second stage, puts this hydraulic coupling member out of action so as to prevent the slipping caused by the latter and thus improve the overall efficiency, by providing a direct mechanical coupling between the input element and the output element.

The invention relates particularly to such transmissions which are intended to be fitted to motor vehicles. These may be either semi-automatic or automatic.

In practice, in the transmissions of the kind in question, the clutch used comprises an axially-movable coupling element which is rotationally integral with the output element and capable of being made rotationally integral, by friction, with the input element. A clutch of this kind may be reduced to this coupling element.

However, more often, although not necessarily, this clutch may also incorporate a torsion damping assembly, for smoothing out the vibrations inherent in the kinematic chain in which it is interposed, this torsion damping assembly comprising two coaxial parts mounted for relative rotation within the limits of a specified angular clearance and against elastic means acting circumferentially between them, one of said parts being rotationally integral with the coupling element whilst the other is rotationally integral with a rigid hub.

For example, one of the rotary parts may comprise an annular flange and the other part may comprise two guide washers provided on both sides of this flange, parallel thereto, and integral with each other, whilst the elastic means provided circumferentially between these parts then consist of springs partly housed in apertures provided in the flange and partly housed in apertures provided in the guide washers.

One of the problems to be solved in producing transmissions of this type stems from the fact that a rotational connection has to be provided between one of the rotary parts forming the torsion damping assembly, on the one hand, and the coupling element, on the other hand, whilst the latter should also be capable of moving axially.

Two solutions are generally adopted to satisfy this requirement.

In one method, a rigid connection is provided between the flange and the hub with which it is associated, and a grooved connection (such as a splined coupling) is provided between the coupling element and this flange.

In a second arrangement, which is more often used in practice, a rigid connection is provided between the coupling element and the flange, and a grooved or splined connection is provided between this flange and the hub which is associated with it. In both cases, a grooved connection is used.

A grooved connection of this kind can give rise to friction and slipping. Moreover, as a result of jamming or blocking, it is liable to operational breakdowns, thus jeopardising the engagement and/or disengagement of the clutch.

It is also known to provide a rotational connection between two elements by means of tabs, this connection comprising a plurality of elastically deformable tabs usually known as tangential tabs, which are each formed by at least one leaf spring and which, being provided substantially tangentially, relative to a circumference of the assembly, in relation to one of the elements which they connect, permit relative axial displacement of these two elements relative to each other, whilst making them rotationally integral with each other.

A tab connection of this kind is usually used, for example, in orthodox dry clutches, between the pressure plate and the cover.

This invention relates generally to the application of a tab connection of this kind to transmissions having a hydraulic coupling and locking clutch of the kind described above, whether or not the clutch incorporates a torsion damping assembly.

SUMMARY

The invention provides a transmission, especially for a motor vehicle, of the kind comprising, in parallel between an input element intended to be rotationally integral with a first shaft, generally a drive shaft, and an output element intended to be rotationally integral with a second shaft, generally a driven shaft, on the one hand a hydraulic coupling device such as a torque converter or coupler, which comprises an impeller wheel rotationally integral with the input element and a turbine wheel rotationally integral with the output element, and on the other hand a clutch, which comprises an axially movable coupling element which is rotationally integral with the output element and capable of being made rotationally integral, by friction, with the input element, cooperating with a tab connection provided between two elements, said tab connection comprising a plurality of elastically deformable tabs hereinafter referred to as tangential tabs, which are each formed by at least one plate and which, being provided substantially tangentially, relative to a circumference of the assembly, with respect to one of the elements which they connect to the other, permit relative axial movement of these two elements relative to each other, whilst making them rotationally integral with each other, the tab connection acting between the coupling element, on the one hand, and the output element, on the other hand.

If the clutch is reduced to its coupling element, the tab connection used according to the invention is established between, on the one hand, the coupling element, forming a first element, and, on the other hand, either the turbine wheel or output element, forming a second element.

If, in an alternative embodiment, the clutch also comprises a torsion damping assembly, the tab connection used according to the invention is established between, on the one hand, any of the parts constituting this torsion damping assembly, forming a first element, and, on the other hand, either the coupling element or the turbine wheel, forming a second element.

In every case, as a result of the tab connection according to the invention, engagement or disengagement of the clutch is not accompanied by friction, and therefore operational breakdowns are less likely to occur.

It should be emphasised that in the transmission according to the invention the tabs of this connection operate under different conditions, in practice more severe conditions, than those to which tabs of this kind are usually subjected in dry clutches.

In fact, in dry clutches, only part of the couple to be transmitted between the reaction plate or flywheel forming the input element, and its friction disc, forming the output element, passes through the tangential tabs used, whilst the remainder of this couple is transferred directly from this reaction plate or flywheel to this friction disc.

As a result, there is no risk of buckling of the tangential tabs used in a dry clutch of this kind when the latter is operating in reverse or overrun, and the axial pressure of the pressure plate on the friction disc remains the same as it is during a pulling action; the couple to be transmitted is therefore always capable of passing directly from the reaction plate to the friction disc.

This is not the case in the transmission according to the invention, in which on the one hand, all the couple to be transmitted passes through the tangential tabs used and, on the other hand, the coupling element of the clutch is simply applied against a reaction plate, without being clamped against the latter by a pressure plate.

Thus, at the outset, there was no reason to suppose that tangential tabs of this kind could be used in a transmission of the type in question, all the more so because the absence of any axial clamping for the coupling element of the clutch in such a transmission makes it more difficult, owing to the resulting lack of equilibrium, for tangential tabs of this kind, and particularly the points of attachment thereof, to contain the stresses to which they are subjected during operation as a result of the cyclic vibrations and oscillations which, between the engine and the driven wheels, affect the entire kinematic chain of which they form a part.

However, tests have confirmed that the tangential tabs used according to the invention in a transmission with a hydraulic coupling member and a lock-up clutch of the kind in question are completely satisfactory in practice.

However, for increased safety, according to a further feature of the invention, it is proposed that there be provided, between the two elements affected by the tab connection in question, circumferential abutment means with some play, which are adapted to provide, if necessary, a direct rotational coupling of these two elements to each other after the corresponding play has been absorbed.

Circumferential abutment means with play of this kind may, for example, comprise at least one abutment member carried in an axially projecting position on one of the elements concerned and engaging with play in a recess provided for this purpose in the other said element; this abutment member may either be formed simply by an axial extension of one of the rivets normally used for attaching tangential tabs to the corresponding element at one of their ends, or may be a part which is separate from these rivets.

Whatever the case, these circumferential abutment means with play will automatically overcome the consequences of any buckling of the tangential tabs used, particularly during reverse or overrun operation of the transmission.

Moreover, because of the resulting safety, these circumferential abutment means with play make it possible to use a minimal number of tangential tabs, under otherwise identical conditions, thus reducing the cost of the assembly accordingly.

Finally, to increase safety still further, the tab connection used is associated with axial abutment means for limiting the axial displacement of the axially movable member affected by this connection, when the clutch is disengaged, and thus protecting the tabs of the connection.

BRIEF DESCRIPTION OF THE DRAWINGS

FIGS. 7 and 8 are views corresponding to FIG. 5 and each relate to an alternative embodiment;

FIG. 9 is a partial view corresponding to FIG. 1, relating to an alternative embodiment of the transmission according to the invention;

FIG. 10 is a partial circumferential section, through this alternative embodiment, on the line X—X in FIG. 9;

FIG. 11 is a view corresponding to FIG. 10, for another embodiment of the transmission according to the invention;

FIG. 13 is a partial elevation of a flange used in this alternative embodiment, shown separately;

FIG. 14 is a partial axial section through alternative embodiment of the transmission according to the invention;

DESCRIPTION OF THE PREFERRED EMBODIMENTS

Figure 1:
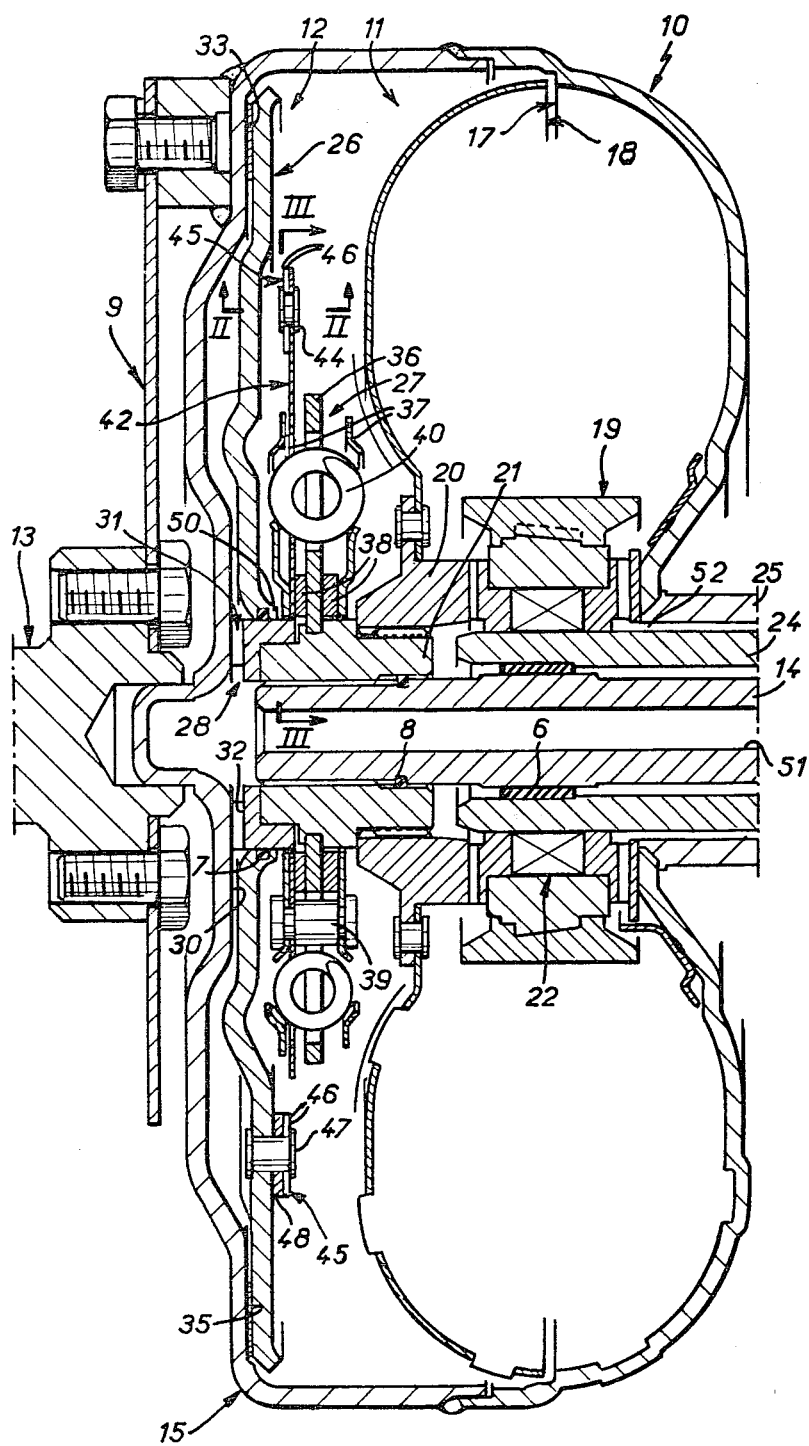
FIG. 1 is a partial axial section through a transmission according to the invention.

FIG. 1 shows a transmission 10 with a hydraulic coupling member 11 and a lock-up clutch 12 of the type fitted to certain motor vehicles. It may be an automatic transmission or a semi-automatic transmission.

Since this transmission 10 as a whole is not in itself the object of this invention, not all its details are shown in FIG. 1, particularly as regards the control means; instead, FIG. 1 shows only those components of the transmission which relate to this invention.

The hydraulic coupling member 11 and the clutch 12 are provided in parallel between an input element on the one hand, formed by the rotating housing 15 of the assembly, and an output element on the other hand, formed, in the embodiment shown, by a tubular hub 21.

The housing 15 is intended to be rotationally integral with a drive shaft 13, and a drive diaphragm 9 connects this housing 15 to the shaft 13 for this purpose.

The tubular hub 21 is intended to be rotationally integral with a driven shaft 14, and for this purpose a splined coupling is provided between the tubular hub 21 and the shaft 14.

In practice, the drive shaft 13 itself is intended to be rotationally integral with the output shaft of the motor of the vehicle in question, or even consist of this output shaft, whilst the driven shaft 14 is intended to be rotationally integral with the input shaft of a gear box, or even consist of this input shaft.

In the embodiment shown, the hydraulic coupling member 11 is a torque converter and comprises an impeller wheel 17, a turbine wheel 18 and a reactor wheel 19; however, it could equally be a simple coupler.

The impeller wheel 17 is directly fixed to the inner wall of the rotating housing 15; it is therefore rotationally integral with the latter, which forms the input element of the transmission.

The turbine wheel 18, in contrast, is carried by a hub 20 which is rotationally integral, via a splined coupling, with the tubular hub 21 forming the output element of the transmission.

Finally, the reactor wheel 19 is itself carried, via a free wheel 22, by a tubular boss 24 which extends coaxially around the driven shaft 14, between the latter and a sleeve 25 integral with the rotating housing 15, and to provide a seal a seal 8 is provided between the tubular hub 21 and the driven shaft 14.

Similarly, a bearing block 6 is provided between the driven shaft 14 and the tubular hub 24.

As a whole, the clutch 12 comprises, in the embodiment shown in FIG. 1, a coupling element 26, on the one hand, and a torsion damping assembly 27, on the other hand.

Overall, the coupling element 26 forms an annular cheek which is mounted, by means of a piston assembly rendered leaktight by means of a seal 7, in axially movable manner on a support ring 28; the latter, which has an L-shaped cross section, engages on the tubular hub 21 and, with its flange is centred by the latter; furthermore, it is axially braced between this tubular hub 21 and a transverse area 30 of the rotating housing 15 and comprises, in contact with the latter, axial extensions 31 which define between them radial passages 32 suitable for the circulation of fluid.

In the embodiment shown, the coupling element 26 comprises annularly, on its outer periphery, opposite an annular area 33 of the rotating housing 15, a friction lining 35 by means of which it is capable of being made rotationally integral by friction with this rotating housing 15 which forms the input element of the transmission; alternatively, the friction lining 35 may be carried by the rotating housing 15.

In the manner known per se, according to constructional methods which will not be described in detail here, the torsion damping assembly 27 comprises two coaxial portions mounted so as to be rotational relative to each other, within specified angular limits, and counter to elastic means adapted to act circumferentially between them.

In practice, one of these rotary portions comprises an annular flange 36 which extends radially around the tubular hub 21, whilst the other rotary portion comprises two annular guide washers 37 which extend parallel to the flange 36, on both sides thereof, with the interposition of friction discs 38, and which are integral with one another by means of axial pins 39 passing, with some play, through openings provided for this purpose in the flange 36. The elastic means adapted to act circumferentially between these rotary portions consist of springs 40 housed, substantially at a tangent to a circumference of the assembly, partly in windows provided for this purpose in the flange 36 and partly in windows provided for this purpose in the guide washers 37.

In the embodiment shown in FIG. 1, the flange 36 is rotationally integral with the tubular hub 21, being carried by the latter, whilst the guide washers 37 are freely rotatable relative to this tubular boss 21.

According to the invention, a tab connection is provided between the coupling element 26 and the output element of the transmission thus formed.

In the embodiment shown in FIG. 1, a tab connection of this kind is provided between, on the one hand, the coupling element 26 forming a first element and, on the other hand, that one of the rotary parts constituting the torsion damping assembly 27 which comprises the guide washers, forming a second element, whilst the other of said rotary portions, namely the one comprising the flange 36, is integral with the output element which in this case is formed by the tubular hub 21.

In practice, to provide a tab connection of this kind, one of the guide washers 37, the one nearest the coupling element 26, is fitted with an adjacent flange 42 made integral with the guide washers 37 by means of rivets 39 which interconnect these guide washers 37.

On its periphery this flange 42 comprises a plurality of lugs 43 which are uniformly circularly distributed, and to each of which is attached, by means of a rivet 44, an elastically deformable tab 45.

Each tab 45, which extends substantially tangentially relative to a circumference of the assembly and which is hereinafter referred to as a tangential tab, is formed by at least one leaf spring 46 and, in practice, a plurality of leaf springs 46, i.e. two in the embodiment shown in FIGS. 1 and 2.

Figure 2:
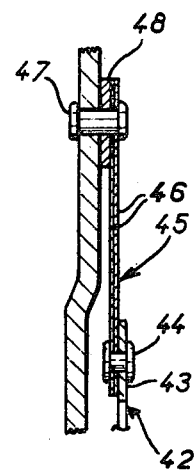
FIG. 2 is a partial circumferential view along the line II—II in FIG. 1.

At its other end, each tangential tab 45 is fixed to the coupling element 26 via a rivet 47, with an interposed spacer 48 in the embodiment shown in FIGS. 1 and 2.

In the manner known per se, due to their axial capacity for elastic deformation, the tangential tabs 45 are adapted to permit relative axial displacement of the two elements which they connect, namely the coupling element 26 and the rotary portion of the torsion damping assembly 27 comprising the guide washers 37, whilst making these two elements rotationally integral with each other.

Associated with the tab connection thus formed are axial abutment means, to limit axial displacement when the clutch 12 is disengaged, given that, when the clutch is engaged, this displacement is in any case limited by the abutment of the coupling element 26 against the rotating housing 15.

In the embodiment in FIG. 1, these axial abutment means are formed by the flange 36, and the coupling element forms, towards said flange 36, an axial collar 50 by which it can bear against this flange 36 through the components of the torsion damping assembly 27 interposed between it and the hub flange 36, whilst it should be remembered that the tubular hub 21 carrying the hub flange 36 is itself suitably axially controlled by the hub 20.

A passage 51 is drilled axially through the output shaft 14.

During disengagement of the clutch 12, pressurised oil is admitted through this passage 51 and through the radial passages 32, to penetrate into the space formed between the rotating housing 15 and the coupling element 26, thus forcing this coupling element to move away from this housing and thus become rotationally disconnected from the latter, owing to the leaktight seal provided by the seals 7 and 8 and the bearing block 6.

After circulating through the hydraulic coupling member 11, the oil passes, through a passage 52 provided between the tubular hub 24 of the reactor wheel 19 and the sleeve 25 of the rotating housing 15, into a return space.

On the other hand, when the clutch 12 is to be engaged, pressurised oil arrives through this passage 52 and circulates through the hydraulic coupling member 11 and the internal space of the rotating housing 15.

Owing to the presence of this oil, the hydraulic coupling member 11 ensures that the driven shaft 14 is progressively made hydraulically integral with the drive shaft 13, with the normal slippage associated with such transmissions, whilst the turbine wheel 18 is integral with the driven shaft 14 and the impeller wheel 17 with the drive shaft 13.

However, the oil which has thus circulated in the internal space of the rotating housing 15 and initially leaves it again through the radial passages 32 and the axial passage 51 progressively acts on the coupling element 26 by its flow, and finally comes to press it forcefully against the annular area 33 of the housing 15.

Taking into account the leaktight seal provided by the seals 7 and 8 and the bearing block 6, this results, on the one hand, in an interruption in the return circuit for this oil, the supply of which is then reduced to a tapping-up supply of the leaktight space thus confined, and on the other hand in a direct rotational connection, by friction, of the driven shaft 14 to the drive shaft 13, via the coupling element 26, the torsion damping assembly 27 and the tubular hub 21.

In other words, the hydraulic coupling member 11 is then idle, and as a result there is no slipping between the driven shaft 14 and the drive shaft 13.

Figure 4:
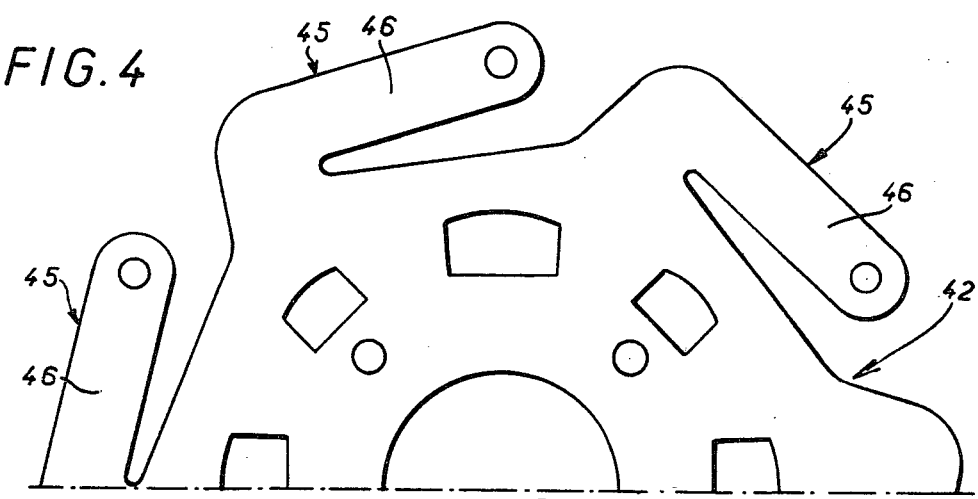
FIG. 4 is a view corresponding to FIG. 3, showing an alternative embodiment of the flange.

According to the alternative embodiment shown in FIG. 4, the tangential tabs 45 forms an integral part of the flange 42, being cut out from this flange on the periphery thereof.

In this case, each of these tangential tabs 45 normally consists of only one leaf spring 46, but these can be reinforced by one or more such leaf springs if desired.

Figure 5:
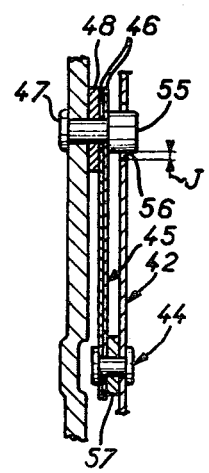
FIG. 5 is a view corresponding to FIG. 2, showing an alternative embodiment of the transmission according to the invention.
Figure 3:
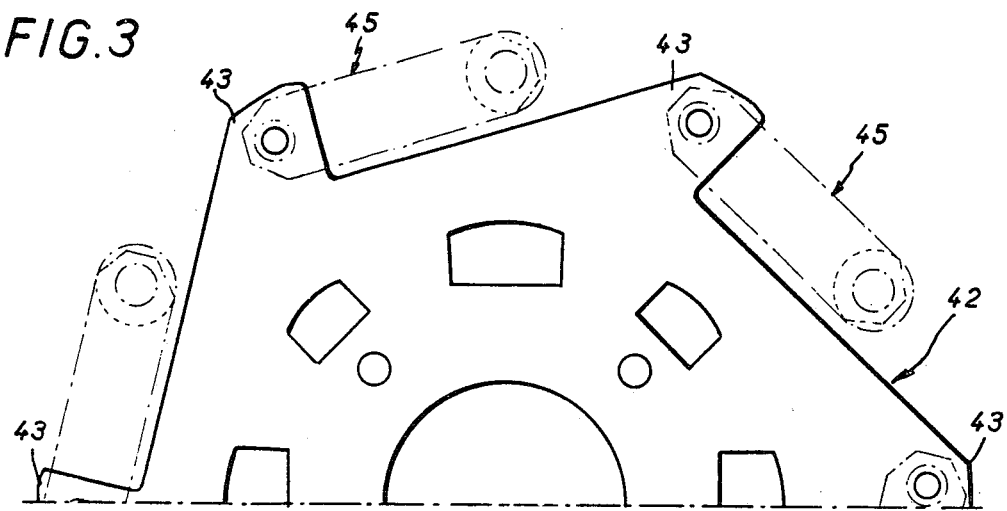
FIG. 3 is a half-elevation, on the line III—III in FIG. 1, of a flange within the transmission.
Figure 6:
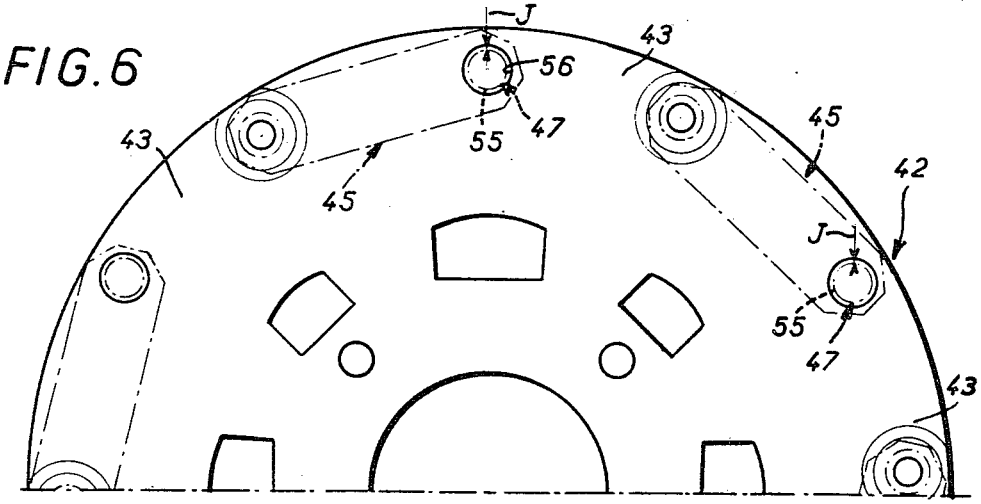
FIG. 6 is a view similar to FIG. 3, for this alternative embodiment.

According to the alternative embodiment shown in FIGS. 5 and 6, between the elements involved in the tab connection according to the invention, namely, on the one hand, the coupling element 26 and, on the other hand, the rotary portion of the torsion damping assembly 27 comprising the guide washers 37, there are also provided circumferential abutment means with some play which are adapted to provide a direct rotational coupling of these two elements to each other in the event of buckling of the tangential tabs 45 which connect them.

In practice, there is no danger of such buckling when the transmission is in the pulling state and the tangential tabs 45 are subjected to traction.

However, there can be a danger of buckling when the transmission is operating in reverse or overrun, when the tangential tabs 45 are thus subjected to compression.

The circumferential abutment means with play according to the invention comprise at least one abutment member 55 which projects axially from one of the elements concerned and which engages with play in a recess provided for this purpose in the other element.

In the embodiment shown in FIGS. 5 and 6, each of these abutment members 55 is individually formed by the axial extension of a rivet 47 by means of which a tangential tab 45 is fixed to the clutch friction coupling 26 at one of its ends.

The abutment member 55 thus formed engages, with annular play J, in an opening 56 provided for this purpose in the flange 42, the latter then having a circular contour, in order to form the lugs 43 and also to extend at right angles to the rivets 47.

If buckling of the tangential tabs 45 occurs, each abutment member 55 comes to bear against the edge of the opening 56 in the flange 42 through which it passes, thus ensuring a direct rotational coupling between the flange 42 and the coupling element 26 and hence counteracting the effects of the buckling, which as a result does not have any damaging effect on the tangential tabs 45.

Moreover, in the embodiment in FIG. 5, a reinforcing washer 57 is provided around each rivet 44, at the corresponding end of the tangential tab 45 in question.

To achieve the minimum axial dimensions for the assembly, as shown in FIG. 7, each rivet 44 by means of which the corresponding tangential tab 45 is attached to the flange 42, is mounted by means of a boss 58 on this flange 42, projecting towards the coupling element 26 and formed, for example, by an embossed portion on the flange 42.

At the same time, with the same purpose, there is formed, in the coupling element 26, opposite each rivet 44, a recess 59 adapted for axial penetration by this rivet 44 and formed, for example, by a boss on the coupling element 26.

Besides the reduced axial dimensions obtained with this arrangement, this advantageously enables the bracing discs at the attachment ends of the tangential tabs 45 to be eliminated.

Moreover, in this alternative embodiment, the axial abutment means associated with the tab connection consist of rivets 47, at least some of which comprise a shoulder 54 opposite the flange 42 for this purpose.

In the alternative embodiment shown in FIG. 8, each rivet 47, by means of which the corresponding tangential tab 45 is fixed to the coupling element 26, forms an integral part of this coupling element 26, and is made of the same material. Furthermore, according to this embodiment, at least one of the abutment members 55 used forms a part which is individually distinct from the rivets fixing the tangential tabs 45 in position.

In this embodiment, the axial abutment means associated with the tab connection consist of rivets 44, whilst the heads of at least some of these rivets 44 are sufficiently prolonged axially towards the coupling element 26 to enable the latter to abut thereon during disengagement of the clutch 12.

According to a further feature of this embodiment (not shown), one rivet 44 may act as both circumferential and axial abutment means; the same may apply to an abutment member 55, in which case it is carried by the flange 42 and not by the coupling element 26.

In the embodiment shown in FIGS. 9 and 10, the coupling element 26, instead of extending beyond the torsion damping assembly 27 relative to the hydraulic coupling member 11, extends between this assembly 27 and the coupling member 11.

The other components of the transmission are identical to those described hereinbefore.

In the embodiment shown in FIGS. 9 and 10, for example, reinforcing discs 48 and 57 are thus used at the ends of the tangential tabs 45.

In an alternative embodiment, FIG. 11, and according to the details described hereinbefore, reinforcing discs of this kind are eliminated, thanks to the use of bosses 58 embossed in the flange 42 and bosses 61 embossed in the coupling element 26, at right angles to the corresponding rivets.

Moreover, in this variant, as shown diagrammatically by broken lines, the axial abutment means are formed by the abutment members 55 carried by the coupling element 26 and to this end comprise a shoulder 60 beyond the flange 42 through which they pass.

In the embodiments shown in FIGS. 1 and 9, that one of the rotary portions constituting the torsion damping assembly 27 which forms one of the elements involved in the tab connection according to the invention is the one comprising the guide washers 37.

However, in an alternative embodiment, according to an arrangement which is not shown, the portion in question could also be the one consisting of the flange 36, in which case the latter is mounted so as to be freely rotatable relative to the tubular hub 21, whilst the guide washers 37 are made integral therewith, according to arrangements known per se which will not be described in detail here.

Figure 12:
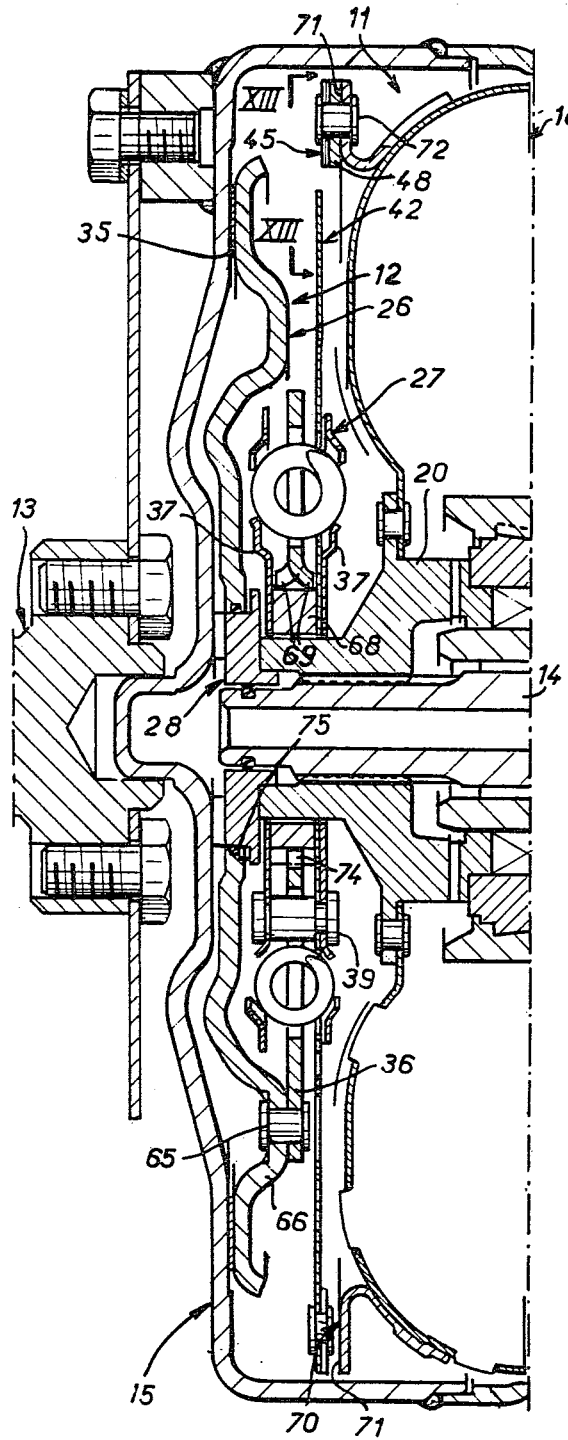
FIG. 12 is a partial axial section through another embodiment of the transmission according to the invention.

In the embodiment shown in FIGS. 12 and 13, the tab connection according to the invention is provided between, on the one hand, either of the rotary portions constituting the torsion damping assembly 27, forming a first element, and, on the other hand, the turbine wheel 18, forming a second element, whilst the other of these rotary portions is carried by the coupling element 26.

Thus, this tab connection again acts between the coupling element 26 and the output element of the transmission which in this case is the hub 20 on the turbine wheel 18, this hub 20 being directly connected, via a splined coupling, to the driven shaft 14.

In the embodiment shown, it is the flange 42, integral with the guide washers 37, which is made integral by the tangential tabs 45 with the turbine wheel 18, whilst the hub flange 36 is fixed by means of rivets 65 to the coupling element 26, by means of bosses 66 formed for this purpose by embossing the coupling element.

Alternatively, however, the flange 42 which is integral with the guide washers 37 could be integral with the coupling element 26, and the flange 36 could be connected to the turbine wheel 18 by a tab connection.

Whichever the case, in this embodiment of the invention, the torsion damping assembly 27 is suspended annularly by its outer periphery between, on the one hand, the coupling element 26 and, on the other hand, the turbine wheel 18.

Since the tubular boss 21 previously provided for this torsion damping assembly 27 is now omitted, the support ring 28 of the coupling element 26 engages on an axial extension of the hub 20 of the turbine wheel 18.

A ring 68 forming a spacer between the guide washers 37 is provided annularly between the flange 36 and this axial extension of the hub 20 of the turbine wheel 18.

On the inner periphery of the flange 36, on the one hand lugs 69 are cut out, which are alternately folded axially towards one or other of the guide washers 37 and which centre the ring 68 and ensure the axial positioning of the hub flange 36, and on the other hand teeth 74 are cut out, which ensure that this ring 68 is rotationally driven.

Whichever the case, to ensure that the tangential tabs 45 are fixed, the turbine wheel 18 comprises on the outside, on its periphery, a collar 70 forming in the transverse direction an annular area 71 by means of which these tangential tabs can be fixed, using rivets 72, FIG. 12, with the interposition of reinforcing discs 48.

The axial abutment means associated with the tab connection used according to the invention, for disengaging the lock-up 12, are formed in this embodiment by a shoulder 75 of the ring 28 against which the coupling element 26 abuts during such disengagement.

As will be seen, in this embodiment, the tab connection used according to the invention is beyond the torsion damping assembly 27, in the direction input element-output element of the transmission; this advantageously protects the tabs.

Figure 15:
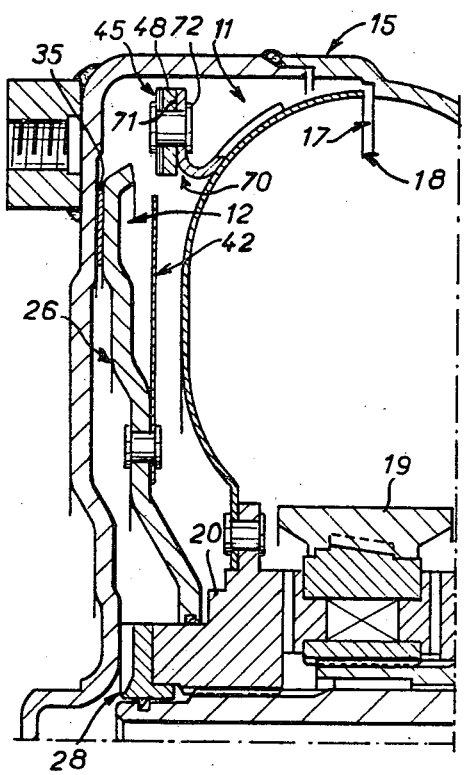
FIG. 15 is a view corresponding to FIG. 14 and relates to another alternative embodiment.

This invention may also be applied to a transmission in which the lock-up clutch 12 does not comprise a torsion damping assembly and is therefore reduced to its coupling element 26, as shown in FIGS. 14 and 15.

In FIG. 14, the tab connection is provided between, on the one hand, the coupling element 26, forming a first element, and on the other hand the hub 20 of the turbine wheel 18, forming a second element; in the embodiment shown, it is formed by leaf springs 46 cut out in the periphery of a flange 42, as shown in FIG. 4, these leaf springs 46 being fixed to the coupling element 26 by means of rivets 47, whilst the flange 42 is fixed to the hub 20 by rivets 77 which make it integral with the turbine wheel 18.

In an alternative embodiment, FIG. 15, the tab connection is provided between the coupling element 26, forming a first element, and the turbine wheel 18, forming a second element, by means equivalent to those described with reference to FIG. 12.

The present invention is not limited to the embodiments described and shown, but covers all alternative constructions and/or combinations of the various elements within the scope of the appended claims.

In particular, the tangential tabs used may be curved in the usual way.

Moreover, the circumferential abutment means described hereinbefore may be replaced by a second set of tabs arranged symmetrically to the first, with the tabs of these two sets forming a 'V', for example, in pairs, from one set to the other.

I claim:

1. A hydraulic coupling device and a lock-up clutch unit for a motor vehicle, said unit comprising a hydraulic coupling device disposed in parallel between an input element for rotation with a driving shaft and an output element for rotation with a driven shaft, said hydraulic coupling device comprising an impeller fixed for rotation with said input element and a turbine fixed for rotation with said output element; a lock-up clutch comprising an axially displaceable coupling element fixed for rotation with said output element and frictionally couplable for rotation with said input element; torque transmitting means operatively connecting said coupling element and said output element, said torque transmitting means including a tab connection comprised of a plurality of leaf spring tabs disposed tangentially relative to a circumference of said unit, said tab connection defining a rotational connection while permitting limited axial displacement, whereby all the torque transmitted from said coupling element to said output element in the engaged position of said lock-up clutch passes through said tab connection.

2. The unit of claim 1, further comprising circumferential abutment means normally out of torque transmitting engagement with said torque transmitting means, said circumferential abutment means being coupled to said torque transmitting means in response to buckling of said tab connection.

3. The unit of claim 2, wherein said circumferential abutment means comprises at least one abutment member which normally projects from a first portion of said torque transmitting means freely into a recess in a second portion of said torque transmitting means.

4. The unit of claim 3, wherein said plurality of tabs are attached by rivets to said first portion of said torque transmitting means, said abutment member forming an extension of one of said rivets.

5. The unit of claim 3, and fastening means securing said plurality of tabs to said first portion of said torque transmitting means, wherein said abutment member is separate and distinct from said fastening means.

6. The unit of claim 1, wherein rivets fix one of the ends of said leaf spring tabs to a first portion of said torque transmitting means, said rivets being arranged on embossments formed on said first portion projecting toward a second portion of said torque transmitting means, so as to minimize the axial dimensions of said unit.

7. The unit of claim 1, wherein rivets fix one of the ends of said leaf spring tabs to a first portion of said torque transmitting means, and recesses defined by embossments provided in a second portion of said torque transmitting means for receiving said rivets so as to minimize the axial dimensions of said unit.

8. The unit of claim 1, wherein rivets fix said leaf spring tabs to a first portion of said torque transmitting means, said rivets being integral with said first portion.

9. The unit of claim 1, wherein said leaf spring tabs are integral with and disposed at the periphery of a flange.

10. The unit of claim 1, wherein said tab connection connects said coupling element to said output element.

11. The unit of claim 1, wherein said tab connection connects said coupling element to said turbine.

12. The unit of claim 1, and further comprising a torsion damping assembly comprising two coaxial rotatable parts mounted for relative angular displacement within predetermined limits, against the action of circumferentially acting resilient means disposed said coaxial parts between, wherein said tab connection connects one of said parts of said torsion damping assembly to said coupling element, the other of said rotatable parts being carried by said output element.

13. The unit of claim 1, and further comprising a torsion damping assembly comprising two coaxial rotatable parts mounted for relative angular displacement within predetermined limits against the action of circumferentially acting resilient means operatively disposed between said coaxial parts, wherein said tab connection connects one of said parts of said torsion damping assembly to said turbine, the other of said rotatable parts of said torsion damping assembly being carried on said coupling element so that said torsion damping assembly is suspended annularly by its outer periphery between said coupling element and said turbine.

14. The unit of claim 1, further comprising axial abutment means associated with said tab connection operative during disengagement of said lock-up clutch.

* * * * *